US006005215A

United States Patent [19]

Boyd et al.

[11] Patent Number: 6,005,215

[45] Date of Patent: Dec. 21, 1999

[54] ELECTRIC ARC SPRAY GUN

[76] Inventors: Larry L. Boyd; Mark A. Boyd, both of P.O. Box 272, Wolf Lake, Ind. 46796

[21] Appl. No.: 09/014,776

[22] Filed: Jan. 28, 1998

[51] Int. Cl.$^{6}$ ..................................................... B23K 9/04

[52] U.S. Cl. ..................................... 219/76.14; 219/76.1

[58] Field of Search .............................. 219/76.14, 76.1, 219/137 R

[56] References Cited

U.S. PATENT DOCUMENTS

| | | | |
|---|---|---|---|
| 3,632,952 | 1/1972 | Thomson et al. | 219/76 |
| 3,798,411 | 3/1974 | Wagner | 219/76 |
| 4,024,369 | 5/1977 | Thomson et al. | 219/76 |
| 4,128,754 | 12/1978 | Rathjen, Jr. | 219/137 R |
| 4,668,852 | 5/1987 | Fox et al. | 219/76.14 |

*Primary Examiner*—Patrick Ryan
*Assistant Examiner*—Anjan Dey
*Attorney, Agent, or Firm*—James A. Hudak

[57] ABSTRACT

An electric arc spray gun wherein the spray tips can be precisely aligned is disclosed. The gun body includes converging wire guides located at an acute angle with respect to the horizontal. The diameter of the central portion of each wire guide is slightly less than the bore in which it is received permitting the wire guide to be deflected by the application of pressure to its outer surface. Such pressure is applied by the advancement or retraction of threaded fasteners received through the gun body. By deflecting the wire guides relative to one another, the spray tips can be precisely aligned. The wires which pass through the wire guides and the spray tips come together within the air cap on the gun resulting in the gun producing a very highly defined metallic spray.

7 Claims, 2 Drawing Sheets

ELECTRIC ARC SPRAY GUN

TECHNICAL FIELD

The present invention relates, in general, to an electric arc spray gun for spraying metallic coatings, and, more particularly, to an electric arc spray gun wherein the spray tips can be precisely aligned with one another so as to produce uniform metallic coatings having a high density.

BACKGROUND ART

The two wire electric arc spray process is the least expensive of the metal spraying processes used for applying metallic coatings. Any electrically conductive materials supplied in wire form can be sprayed. A wire feeder pushes two electrically charged wires through flexible conduits into an arc spray gun where the wires converge and an arc is created. The wires melt in the high temperature zone created by the arc and a concentrically located compressed air stream sustains the arc, atomizes the molten metallic material and conveys the metallic particles onto the object being coated. The particles cool and coalesce into a high quality metal coating on the object being coated.

The design of most electric arc spray guns is such that numerous problems arise in the operation of same. For example, the spray tips must be held in very close alignment and such alignment typically requires very accurate machining of the gun head which is a very expensive process. Alternatively, alignment of the spray tips and wires is sometimes achieved by the combination of a nozzle positioner, a nozzle cap and an arc shield retaining nut assembly. The nozzle positioner and the nozzle cap are supplied in different styles and types. All of these components must be removed each time the spray tips become worn necessitating their replacement. This cumbersome process results in the breakage of components and the possible misalignment of the spray tips. In addition to the problem of maintaining the spray tips in alignment, the design of most electric arc spray guns is such that the wires come together outside the orifice of the air cap. This design results in a less defined spray column which, in turn, reduces the density of the metallic coating on the object being coated. A well defined spray column is difficult to achieve and/or maintain when the wires come together outside the orifice of the air cap.

In view of the foregoing, it has become desirable to develop an electric arc spray gun wherein the spray tips can be held in precise alignment without expensive machining operations and wherein the gun produces a very well defined spray column in order to produce uniform metallic coatings having a high density.

SUMMARY OF THE INVENTION

The present invention solves the problems associated with the prior art spray guns and other problems by providing an electric arc spray gun wherein the spray tips are readily alignable without the need for expensive machining operations and wherein the resulting metallic spray produced by the gun is very well defined. The foregoing is accomplished by utilizing two wire guides which are received within the gun and which can be readily deflected by the advancement or retraction of oppositely disposed, threaded fasteners received through the gun body and which contact the central portion of each wire guide. The outer diameter of the central portion of each wire guide is slightly less than the diameter of the bore in which it is received permitting deflection of the wire guide by the advancement or retraction of its associated oppositely disposed, threaded fasteners. A spray tip is received within the end of each wire guide, and thus, deflection of the wire guide and the wire therein results in a similar deflection of the spray tip and the wire passing therethrough. In this manner, the spray tips can be precisely aligned by merely advancing and/or retracting the aforementioned threaded fasteners. The spray tips are received within the air cap causing the metallic spray to be very well defined, resulting in metallic coatings having a high density.

DESCRIPTION OF THE PREFERRED EMBODIMENT

Figure 1:
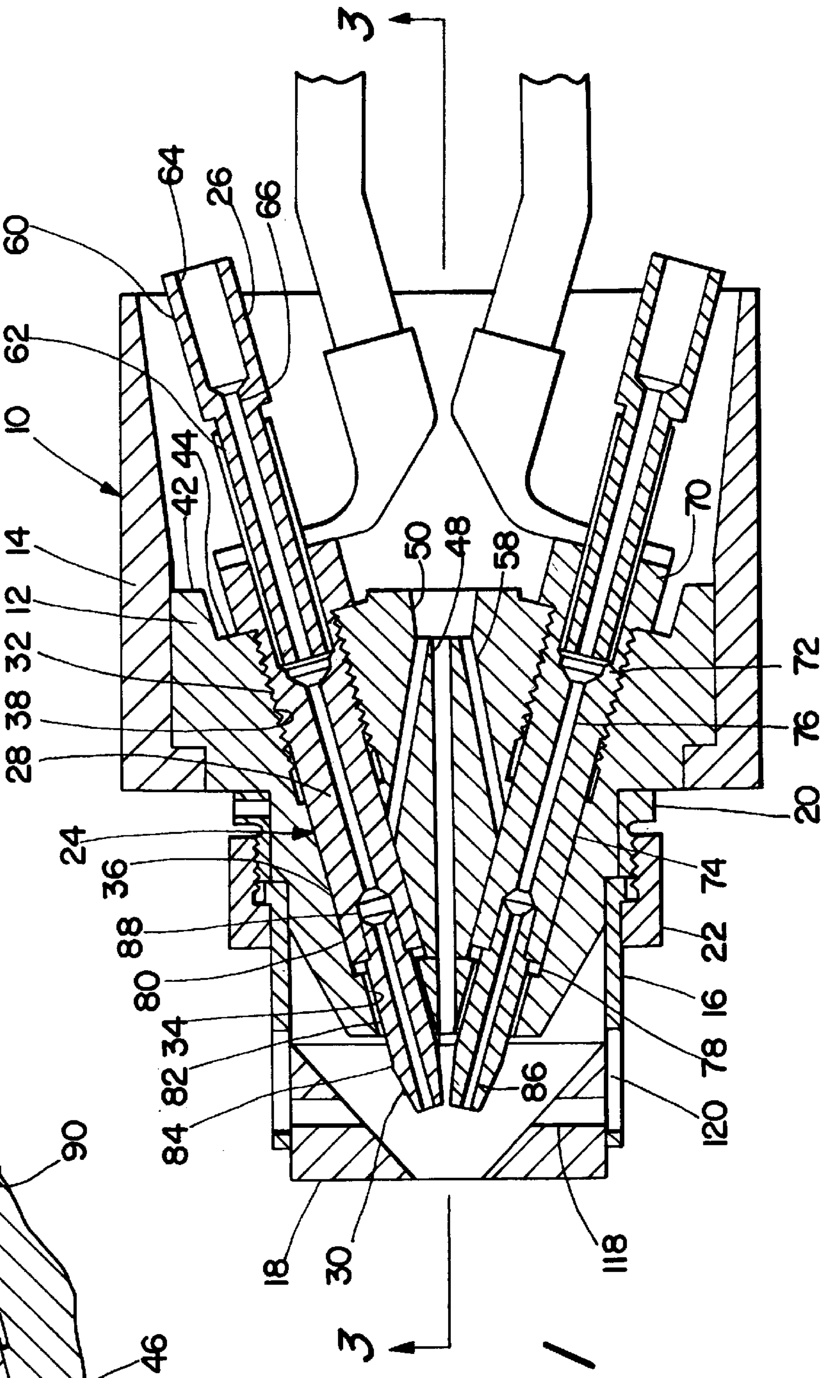
FIG. 1 is a cross-sectional view of the electric arc spray gun of the present invention.

Referring now to the drawings where the illustrations are for the purpose of describing the preferred embodiment of the present invention and are not intended to limit the invention described herein, FIG. 1 is a cross-sectional view of the electric arc spray gun 10 of the present invention. The spray gun 10 is comprised of a gun body 12, an outer housing 14, an air cap 16, an air cap insert 18, an inner retaining ring 20, an outer retaining ring 22, and two wire guides, each referred to generally by the numeral 24 and each comprising an outer connector 26 and an inner connector 28, and a spray tip 30.

Figure 2:
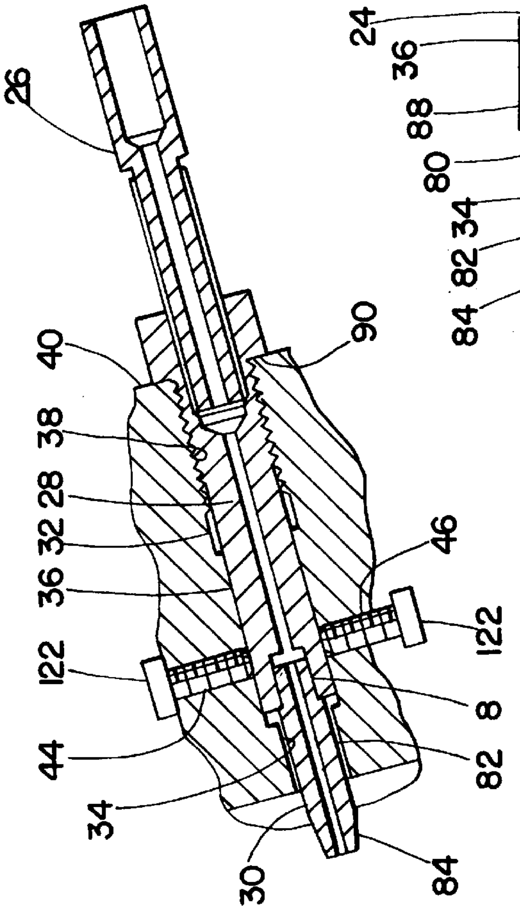
FIG. 2 is a partial, enlarged, cross-sectional view of a wire guide and spray tip utilized in the electric arc spray gun of the present invention.

Gun body 12 is formed from a non-metallic material and has a generally circular cross-sectional configuration in the axial direction. Two converging bores 32, radially positioned approximately 180 degrees apart from one another, are positioned in gun body 12. The orientation of each bore 32 is such so as to be at an acute angle with respect to horizontal. Each bore 32 is comprised of a first bore portion 34, a second bore portion 36 and a third bore portion 38. Second bore portion 36 interconnects first bore portion 34 and third bore portion 38, and has a greater diameter than first bore portion 34. Third bore portion 38 has substantially the same diameter as second bore portion 36, however, third bore portion 38 is threaded throughout its entire length. A spot face 40 is provided in surface 42 of gun body 12 at the entrance to third bore portion 38 of each of the bores 32. As shown in FIG. 2, oppositely disposed, aligned, cross-drilled, threaded bores 44 and 46 are provided in gun body 12 and are positioned so as to be substantially perpendicular to and intersect second bore portion 36 of each bore 32.

Figure 3:
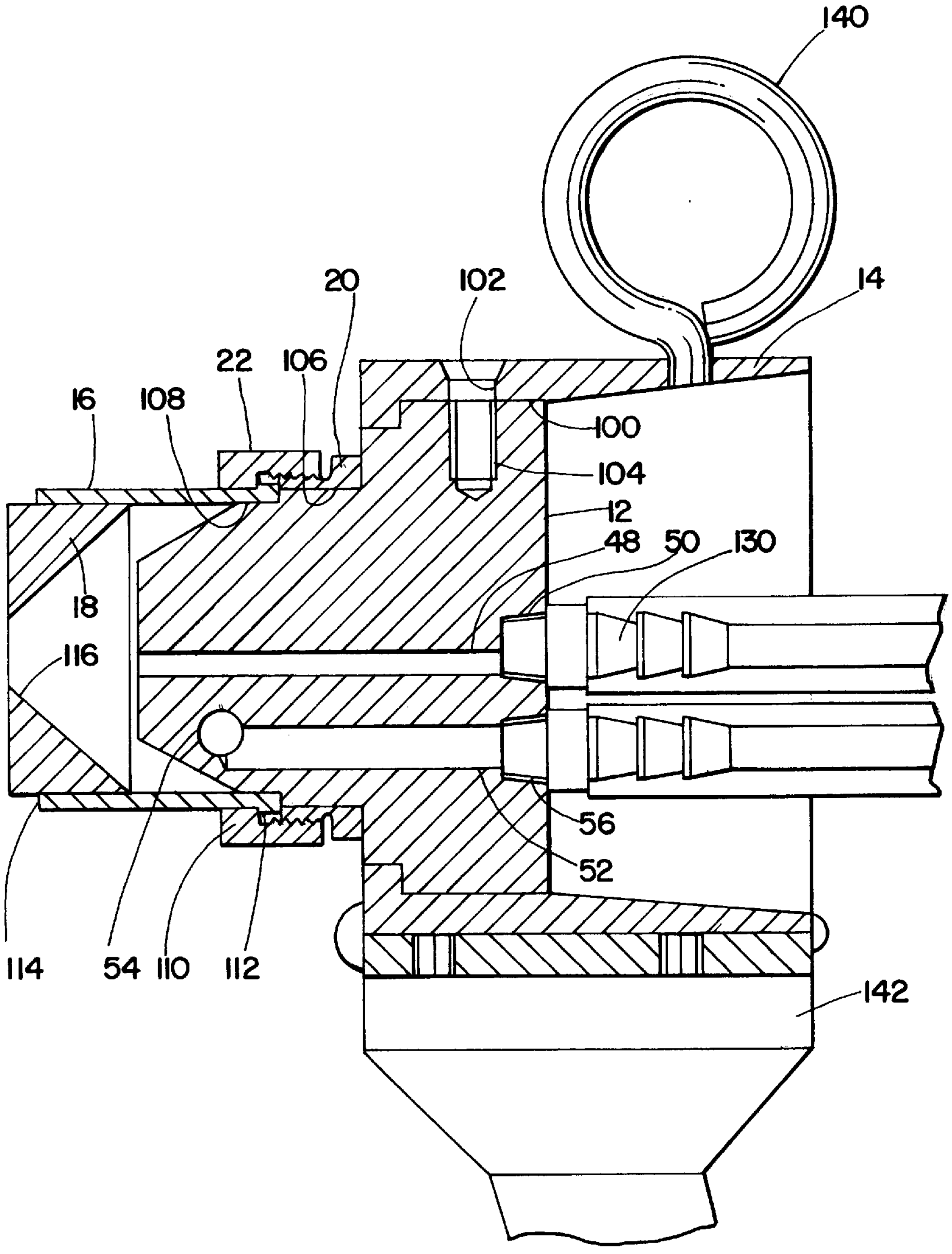
FIG. 3 is a cross-sectional view taken along section indicating lines 3—3 in FIG. 1.

Referring again to FIG. 1 and also to FIG. 3, a bore 48 is provided through gun body 12. A threaded bore 50 is provided in surface 42 of gun body 12 and is in communication with bore 48. A blind bore 52 is provided in surface 42 of gun body 12 and is substantially parallel to and in a spaced-apart relationship with bore 48 and intersects a cross-drilled bore 54 adjacent the opposite end of gun body 12. A threaded bore 56 is provided in surface 42 of gun body 12 and is communication with blind bore 52. As shown in FIG. 1, threaded bore 50 is also in communication with diverging bores 58 which interconnect threaded bore 50 with second bore portion 36 of each bore 32.

Outer connector 26 is generally circular in cross-section, fabricated from steel or the like, and is comprised of a first portion 60 and a second portion 62. A bore 64 is provided in first portion 60 and terminates in a bore 66 through the remainder of first portion 60 and through second portion 62. The exterior surface of second portion 62 of outer connector 26 is threaded. Bore 66 has a smaller diameter than bore 64 and is sized so as to permit the passage of wire therethrough.

Inner connector 28 is typically circular in cross-section and formed from a metallic material, such as bronze. As such, inner connector 28 is comprised of a first portion 70, a second portion 72 and a third portion 74. First portion 70 of inner connector 28 is typically hexagonal in cross-section and threaded interiorly throughout its entire length. The threads within first portion 70 of inner connector 28 continue into the second portion 72 thereof. The exterior of second portion 72 of inner connector 28 is threaded throughout its entire length. Third portion 74 of inner connector 28 has a smaller cross-sectional diameter than second portion 72 and the exterior surface thereof is smooth throughout its entire length. The outer diameter of third portion 74 of inner connector 28 is slightly less than the inner diameter of second bore portion 36 of bore 32 in gun body 12. The threads in first portion 70 and second portion 72 of inner connector 28 terminate in a bore 76 which originates in second portion 72 of inner connector 28, passes through third portion 74 and terminates in an interiorly threaded portion 78 at the opposite end of inner connector 28. Bore 76 is sized so as to permit the passage of wire therethrough.

Spray tip 30 is typically circular in cross-section and is formed from a metallic material, such as copper. The outer diameter of spray tip 30 is slightly less than the inner diameter of first bore portion 34 of bore 32 in gun body 12. Spray tip 30 is comprised of a first threaded portion 80, a second longitudinally extending portion 82 and a tapered portion 84. A bore 86 is provided through spray tip 30 and a tapered conical lead-in surface 88 is provided at the entrance to bore 86. Bore 86 is sized so as to permit the passage of wire therethrough.

Inner connector 28 is threadably received within third bore portion 38 of each bore 32 in gun body 12 and is tightened therein so that surface 90 on first portion 70 of inner connector 28 contacts the surface defining spot face 40 on gun body 12. A spray tip 30 is threadably received within the opposite end of each inner connector 28 and is positioned therein so that the tapered portions 84 of the spray tips 30 are adjacent one another. An outer connector 26 is threadably received within the first and second portions 70, 72 of each inner connector 28.

Referring now to FIG. 3, outer housing 14 is received over end 100 of gun body 12 and is positioned thereon so as to substantially cover the outer connectors 26. A fastener (not shown) is received through an aperture 102 in outer housing 14 and into a threaded blind bore 104 in gun body 12 to firmly attach outer housing 14 to gun body 12. Inner retaining ring 20 is press fit over circumferential surface 106 of gun body 12. Air cap 16 is received over adjacent circumferential surface 108 of gun body 12 and is positioned thereon so that its interior end abuts the outer end of inner retaining ring 20. Outer retaining ring 22 threadably engages inner retaining ring 20 and an inwardly directed circumferential flange 110 thereon compressingly engages an outwardly directed circumferential flange 112 on air cap 16, thus securing air cap 16 to gun body 12. Air cap insert 18 is received within end 114 of air cap 16 and is positioned so that the spray tips 30 are located therein and positioned inwardly of orifice 116 in air cap 18. As shown in FIG. 1, oppositely disposed threaded bores 118 are provided through air cap insert 18 and are aligned with similarly disposed longitudinally extending slots 120 in air cap 16. A fastener (not shown) is received through each of the slots 120 in air cap 16 and into its aligned threaded bore 118 in air cap insert 18 to secure air cap insert 18 within air cap 16.

As shown in FIG. 2, threaded fasteners 122 are provided in oppositely disposed threaded bores 44 and 46 in gun body 12 and contact the outer surface of each inner connector 28 permitting the deflection of same within second bore portion 36 of bore 32 allowing for the precise positioning and alignment of spray tips 30 within air cap 16 and with respect to orifice 116 in air cap 16. It should be noted that if spray tips 30 are long and have a large diameter, e.g., for large diameter wire, they may extend into the second bore portion 36 of bore 32 resulting in threaded fasteners 122 contacting the outer surface of the spray tips 30 rather than the outer surface of the inner connector 28. This situation still permits the precise positioning and alignment of spray tips 30.

As illustrated in FIG. 3, barbed connectors 130 are threadingly attached to bores 50 and 56 in gun body 12 permitting the attachment of pneumatic lines thereto. In addition, an eye hook 140 is attached to the top surface of outer housing 14 permitting the spray gun 10 to be hung from a support. An oppositely disposed handle 142 is attached to the bottom surface of the spray gun 10 permitting the gun to be held by the operator.

The structure of spray gun 10 provides a number of advantages over prior art arc spray gun designs. For example, since the threaded fasteners 122 which are provided in oppositely disposed threaded bores 44 and 46 in gun body 12 contact the outer surface of the inner connector 28, advancement or retraction of these fasteners permits the deflection of each of the inner connectors 28 within the second bore portion 36 of bore 32 allowing for the precise positioning and alignment of the spray tips 30 within air cap 16. Such precise alignment of the spray tips 30 allows the wires which pass therethrough to be uniformly atomized. In addition, such precise alignment of the resulting arc in relation to the orifice 116 in air cap insert 18 provides uniform atomization of the arc and improves the operating stability of the spray gun 10. It should be noted that such precise alignment of the spray tips 30 is achieved without the utilization of intricately machined parts, such as those utilized in the prior art spray guns. In addition, the precise alignment of the spray tips 30 is maintained even though the spray gun 10 is subjected to harsh operating conditions, such as severe impacts, since the spray tips 30 are located within the air cap 16.

With respect to the air cap 16, the inherent design of the cap minimizes spray turbulence and concentrates the spray pattern toward the object being coated with the metallic spray. The orifice 116 in the air insert 18 focuses the arc column for maximum particle deposition density on the object being coated. The bi-metal construction of the air cap 16, i.e., the air cap insert 18 is formed from copper whereas the air cap 16 is formed from aluminum, allows for improved radiant and convective energy dissipation. The resulting cooling characteristics of the air cap 16 permits atomization of the wire within the air cap insert 18 or flush with the orifice 116 in the air cap insert 18. In addition, the air cap insert 18 is easily removed and replaced in a fixed alignment within air cap 16 by merely removing the fasteners which pass through the slots 120 in the air cap 16 and threadingly engage the air cap insert 18. As for "feeding" the wires through the spray gun 10, the tapered lead-in surfaces in the outer connector 26, inner connector 28 and spray tips 30 minimize wire jamming in the initial "threading" of the wire through the gun body 12. These lead-in surfaces also minimize jamming of the wire as it passes through the gun body 12 during the operation of the spray gun 10.

Cooling of the gun 10 is achieved through the passage of air through bores 58 to impinge upon the outer surface of each of the inner connectors 28. In this manner, each of the outer connectors 26, inner connectors 28 and spray tips 30 are maintained at optimum operating temperature.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. An electric arc spray gun comprising a body member having at least one bore therethrough, a wire guide receivable within said bore in said body member, a plurality of spray tips, one of said spray tips being receivable within said bore in said body member and being operatively connected to said wire guide, and means for adjusting the position of said wire guide within said bore in said body member, said adjusting means being received within said body member and being positioned therein so as to contact said wire guide, radial movement of said adjusting means within said body member permitting the precise alignment of said one of said spray tips within said bore in said body member relative to another of said spray tips.

2. The electric arc spray gun as defined in claim 1 further including an air cap mounted on said body member and surrounding said spray tips, said air cap having a generally cylindrical configuration throughout its length.

3. The electric arc spray gun as defined in claim 2 further including means for adjustably attaching said air cap to said body member.

4. The electric arc spray gun as defined in claim 3 wherein said insert is laterally movable within said air cap permitting the distance between the ends of said plurality of spray tips and said orifice in said insert to be adjustable.

5. The electric arc spray gun as defined in claim 4 further including means for locking the position of said insert within said air cap.

6. An electric arc spray gun comprising a body member having at least one bore therethrough, a wire guide receivable within said bore in said body member, a plurality of spray tips, one of said spray tips being receivable within said bore in said body member and being operatively connected to said wire guide, means for adjusting the position of said wire guide within said bore in said body member, said adjusting means being received within said body member and being positioned therein so as to contact said wire guide, actuation of said adjusting means permitting the precise alignment of said one of said spray tips within said bore in said body member relative to another of said spray tips, an air cap mounted on said body member and surrounding said spray tips and an insert receivable within the end of said air cap, said insert having an opening therein defining an orifice for air passing through said spray gun, said plurality of said spray tips being located interiorly of said orifice in said insert.

7. An electric arc spray gun comprising a body member having at least one bore therethrough, a wire guide receivable within said bore in said body member, a plurality of spray tips, one of said spray tips being receivable within said bore in said body member and being operatively connected to said wire guide, means for adjusting the position of said wire guide within said bore in said body member, said adjusting means being received within said body member and being positioned therein so as to contact said wire guide, actuation of said adjusting means permitting the precise alignment of said one of said spray tips within said bore in said body member relative to another of said spray tips, and a bore intersecting said at least one bore in said body member permitting the introduction of a cooling medium into said at least one bore.

* * * * *